US012647545B2

(12) United States Patent
Jeromin et al.

(10) Patent No.: US 12,647,545 B2
(45) Date of Patent: Jun. 2, 2026

(54) CALIBRATION SYSTEMS AND METHODS FOR DYNAMIC PROJECTION MAPPING

(71) Applicant: Universal City Studios LLC, Universal City, CA (US)

(72) Inventors: Aaron Chandler Jeromin, Orlando, FL (US); Christopher David Layfield, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 430 days.

(21) Appl. No.: 18/206,549

(22) Filed: Jun. 6, 2023

(65) Prior Publication Data

US 2023/0403381 A1    Dec. 14, 2023

Related U.S. Application Data

(60) Provisional application No. 63/350,301, filed on Jun. 8, 2022.

(51) Int. Cl.
*H04N 9/31*          (2006.01)
(52) U.S. Cl.
CPC ................................. *H04N 9/3191* (2013.01)
(58) Field of Classification Search
CPC .. H04N 9/3191; H04N 9/3194; H04N 9/3185; H04N 9/3147; G03B 21/14
See application file for complete search history.

(56) References Cited

U.S. PATENT DOCUMENTS

| | | | |
|---|---|---|---|
| 7,068,274 B2 | 6/2006 | Welch et al. | |
| 7,342,669 B2 | 3/2008 | Kawasaki et al. | |
| 8,259,997 B2 | 9/2012 | Audet et al. | |
| 8,320,661 B2 | 11/2012 | Barbour | |
| 9,472,011 B2 | 10/2016 | Linnell | |
| 9,832,352 B2 | 11/2017 | Linnell | |
| 9,958,767 B1 | 5/2018 | Reichow et al. | |
| 10,089,778 B2 | 10/2018 | Moule et al. | |
| 10,271,036 B2 | 4/2019 | Phipps | |
| 11,232,595 B1 | 1/2022 | Momcilovic et al. | |
| 2022/0323874 A1* | 10/2022 | Jeromin | A63G 31/00 |

FOREIGN PATENT DOCUMENTS

| | | |
|---|---|---|
| JP | 2020202486 A | 12/2020 |
| WO | 2010102288 A2 | 9/2010 |
| WO | 2021051126 A1 | 3/2021 |
| WO | 2022216913 A1 | 10/2022 |

OTHER PUBLICATIONS

"Green Hippo", 2022, https://www.green-hippo.com/, 7 pgs.
"Natural Point", 2022, https://www.naturalpoint.com/, 2 pgs.
(Continued)

*Primary Examiner* — Ryan D Howard
(74) *Attorney, Agent, or Firm* — Fletcher Yoder, P.C.

(57) ABSTRACT

A calibration tool for a dynamic projection mapping system includes a rigid body, a row of at least three light emitters disposed on the rigid body, and an additional light emitter disposed on the rigid body and offset from the row of the at least three light emitters. The calibration tool also includes a sensor disposed on the rigid body and configured to detect projected light.

20 Claims, 7 Drawing Sheets

(56)                 References Cited

OTHER PUBLICATIONS

"Christie Mystique—Automated camera-based alignment software", Jul. 2020, 9 pgs., Christie Digital Systems USA, Inc.
Vicon, "Vicon MX Hardware System Reference—Revision 1.4", Vicon MX System—Motion measurement and analysis system, 2004-2006, 216 pages, Vicon Motion Systems Limited.
U.S. Appl. No. 17/714,818, filed Apr. 6, 2022, Aaron Chandler Jeromin.
PCT/US2023/024730 International Search Report and Written Opinion mailed Sep. 25, 2023.
Petkovic, Tomislav et al., "A Note on Geometric Calibration of Multiple Cameras and Projectors," 2020 43rd International Convention On Information, Communication And Electronic Technology (MIPRO), Sep. 28, 2020, pp. 1157-1162.
Vicon, "Vicon Vantage Reference," Apr. 1, 2016, 216 pages, https://www.prophysics-sol.se/wp-content/uploads/2017/06/ViconVantageReference.pdf.

* cited by examiner

CALIBRATION SYSTEMS AND METHODS FOR DYNAMIC PROJECTION MAPPING

CROSS-REFERENCE TO RELATED APPLICATION

This application claims priority to and the benefit of U.S. Provisional Application No. 63/350,301 filed Jun. 8, 2022, entitled "CALIBRATION SYSTEMS AND METHODS FOR DYNAMIC PROJECTION MAPPING," which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain, among many other attractions, animated figures to entertain guests. Certain animated figures may be brought to life by projection mapping, which traditionally directs predetermined appearances onto the animated figures. For example, an animated figure may be visually supplemented with a canned or fixed set of images, which may align with preprogrammed movements of the animated figure. The animated figure may have an internally-positioned projector that projects the images through a semi-transparent projection surface of the animated figure; however, the internally-positioned projector may also generate an unrealistic backlighting or glow across the semi-transparent project surface of the animated figure. It is presently recognized that it is desirable to make the animated figures appear more lifelike, as well as to provide the animated figures with the ability to contextually blend with their environment in a realistic, convincing manner.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a calibration tool for a dynamic projection mapping system includes a rigid body, a row of at least three light emitters disposed on the rigid body, and an additional light emitter disposed on the rigid body and offset from the row of the at least three light emitters. The calibration tool also includes a sensor disposed on the rigid body and configured to detect projected light.

In one embodiment, a dynamic projection mapping system includes a projector configured to project visible light. The dynamic projection mapping system also includes a calibration tool with multiple emitters configured to emit infrared light and a sensor configured to detect the visible light projected by the projector. The dynamic projection mapping system further includes multiple tracking cameras configured to generate image data that indicates the infrared light emitted by the multiple emitters. The dynamic projection mapping system further includes processing circuitry configured to establish a common origin point for the projector and the multiple tracking cameras based on sensor data received from the sensor and the image data received from the multiple tracking cameras.

In one embodiment, a method of operating a projection system and an optical tracking system for dynamic projection mapping includes instructing, via processing circuitry, a set of emitters of a calibration tool to emit light in an environment. The method also includes receiving, from multiple tracking cameras and at the processing circuitry, image data indicative of respective locations of each emitter of the set of emitters in the environment. The method further includes instructing, via the processing circuitry, a projector to project visible light into the environment. The method further includes receiving, from a sensor of the calibration tool and at the one or more processors, sensor data indicative of the visible light detected by the sensor. The method further includes establishing, via the processing circuitry, a common origin point in the environment for the multiple tracking cameras and the projector based on the image data and the sensor data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
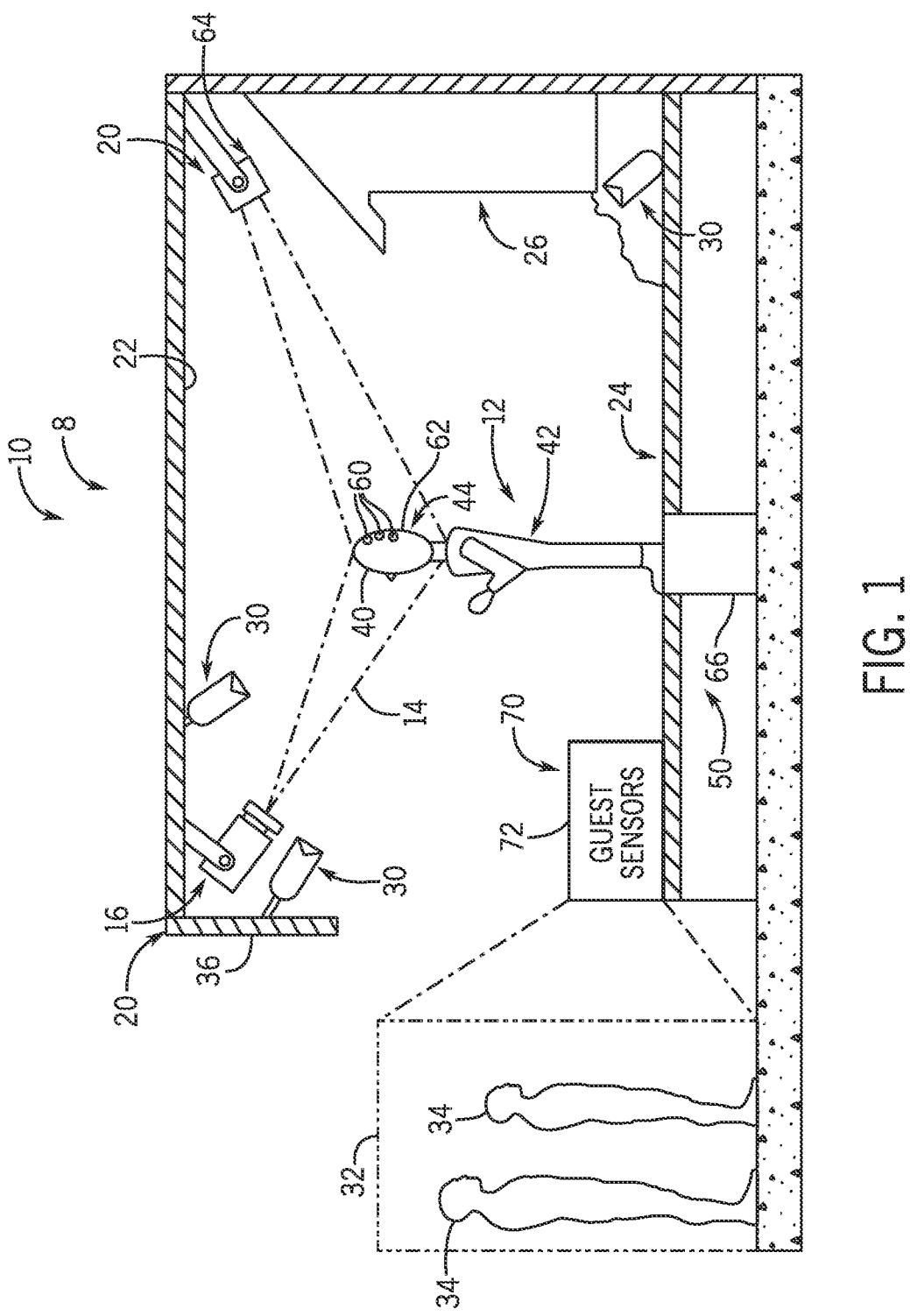
FIG. 1 is a schematic diagram of an embodiment of a media system including a motion tracking system and a projection system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed to a media system for an attraction in an entertainment environment (e.g., theme park, amusement park, theatre, stadium, concert hall). The media system may include a projector that projects images onto an external surface of a prop, such as an animated figure. As discussed herein, the media system leverages external tracking (e.g., via optical performance capture or optical motion capture) of the animated figure to dynamically generate and accurately project images onto the external surface of the animated figure.

In more detail, to support accurate projection of the images onto the animated figure, the animated figure may be fitted with trackers that enable tracking cameras of a motion tracking system of a media control system to discern movements, positions, and orientations of the animated figure in real-time. The media control system may operate independently of the animated figure (e.g., by not relying on position, velocity, and/or acceleration information from sensors or actuators of the animated figure), and the media control system may dynamically generate and fit projected images onto the animated figure at a realistic frame rate that emulates live characters, such as by presenting textures, colors, and/or movements that appear to be indistinguishable from the animated figure. As will be understood, the media control system may generate and update a skeletal model of the animated figure based on feedback from the tracking cameras. The skeletal model generally represents the moveable portions of the animated figure, and is dynamically updated to represent a current three-dimensional (3D) position (e.g., including x, y, and z coordinates), orientation, and scale of the animated figure or portions thereof (e.g., a pose of the animated figure). The media control system therefore utilizes the skeletal model to generate the images for projection that precisely suit the current position and orientation of the animated figure. As discussed herein, a calibration process may be carried out to calibrate the tracking cameras of the motion tracking system and the projector of a projection system to a show set (e.g., a show space), and thus, to calibrate the tracking cameras of the motion tracking system and the projector of the projection system to one another (e.g., share a common origin point and coordinate system).

While certain examples presented herein refer to an animated figure to facilitate discussion, it should be appreciated that this term is intended to broadly cover any prop that may move in the attraction and/or that may be projected onto via the projection system. Generally, it should be considered that the techniques disclosed herein may be applied to project onto any prop (e.g., object; structure; show action equipment [SAE]). For example, the prop may be a full animated robotic figure. As another example, the prop may be one or more objects (e.g., buildings, wands, swords, or other objects that are simpler than a full animated robotic figure) that are moved around via complex SAE, the full animated robotic figures, and/or a participant (e.g., a human participant or actor). Indeed, the prop may be the participant (e.g., the human participant or actor) Furthermore, regardless of its structure, the prop may represent a character (e.g., a human-like character, an animal-like character) or may not represent a character (e.g., an inanimate object, such as a building, furniture, water).

With the foregoing in mind, FIG. 1 illustrates a media system 8 (e.g., dynamic projection mapping system) of an attraction 10 that includes a prop, which may be referred to herein as an animated FIG. 12, that receives images 14 (e.g., projected content) from a projector 16 (e.g., external projector, optical projector with lens) of a projection system of a media control system 20. As shown, the attraction 10 is a show set having a stage ceiling 22, a stage floor 24, and scenery objects 26 disposed between the stage ceiling 22 and the stage floor 24. The show set may also include any suitable stage lighting devices 30, such as the illustrated lighting instruments or devices. From a guest area 32 of the attraction 10, multiple guests 34 may view and/or interact with the animated FIG. 12. Although illustrated as within a stage-type environment, it should be understood that the media system 8 may be utilized to entertain guests 34 in any entertainment environment, such as a dark ride, an outdoor arena, an area adjacent to a ride path of a ride vehicle carrying the guests 34, and so forth.

Notably, the projector 16 is external to the animated FIG. 12, thereby enabling an enclosed volume within the animated FIG. 12 to be utilized to house components other than the projector 16, such as certain actuation systems. In the illustrated embodiment, the projector 16 is disposed in front of the animated FIG. 12 and obstructed from sight of the guests 34 by an overhang 36 of the stage ceiling 22. Regardless of the position of the projector 16, the projector 16 directs the images 14 onto an external surface 40 of a body 42 (e.g., structure) of the animated FIG. 12, which may correspond to a head portion 44 of the animated FIG. 12. The media control system 20 may therefore deliver realistic and engaging textures to the head portion 44, thereby providing an immersive and interactive experience to the guests 34.

The animated FIG. 12 is part of a motion control system 50 (e.g., prop control system) that may operate independently of the media control system 20. For example, the motion control system 50 may leverage interactive data to dynamically update the animated FIG. 12. It should be understood that the motion control system 50 may instruct actuators to adjust the animated FIG. 12 and/or to adjust the position of any other suitable components of the attraction 10 that may be viewable to the guests 34. For example, the motion control system 50 may control an actuatable motion device 66 (e.g., actuatable motion base) that is physically coupled to the animated FIG. 12. The actuatable motion device 66 may be any suitable motion-generating assembly that may move (e.g., translate, rotate) the animated FIG. 12 laterally, longitudinally, and/or vertically. Furthermore, it should be appreciated that the actuatable motion device 66 may be or include a suspension system and/or flying system that is coupled to the animated FIG. 12 from above the stage floor 24.

Trackers 60 (e.g., trackable markers) may be positioned on the animated FIG. 12. The trackers 60 may be positioned on a back surface 62 or on any suitable surface of the animated FIG. 12. The trackers 60 enable one or more tracking cameras 64 of a motion tracking system of the media control system 20 to sense or resolve a position and an orientation of the animated FIG. 12 within the attraction 10, such as via optical performance capture or optical motion capture techniques. Thus, as will be understood, the projector 16 may project the images 14 onto the animated FIG. 12 in synchronization with an actual, current position and orientation (e.g., pose) of the animated FIG. 12, without relying on position, velocity, and/or acceleration information from sensors or actuators of the animated FIG. 12. However, it should be appreciated that in some embodiments, the media control system 20 may verify the positioning and operation of the projector 16 based on sensor-derived and/or actuator-derived information from the animated FIG. 12.

It should be understood that the media system 8 may include any suitable number of projectors 16, trackers 60, and tracking cameras 64. For example, more than one animated FIG. 12 may be included within a single attraction 10, and the media system 8 may include at least one projector 16 for each animated FIG. 12. However, it is presently recognized that the particular infrastructure of the media system 8 enables any number of animated FIG. 12 that are moveable within an optical range of at least one tracking camera 64 and moveable within a projection cone of at least one projector 16 to receive the images 14. In an embodiment, multiple projectors 16 may be provided to deliver content to multiple sides of a single animated FIG. 12. Additionally, certain embodiments of the animated FIG. 12 may include at least two trackers 60 to enable the one or more tracking camera 64 to resolve the relative positioning of the at least two trackers 60 for efficient tracking of the animated FIG. 12, though it should be understood that changes in position of a single tracker 60 may also enable resolution of the position of the animated FIG. 12 with a less complex and/or less precise system.

In an embodiment, the projectors 16 and the tracking cameras 64 may be physically coupled to one another. For example, the projectors 16 and the tracking cameras 64 may be rigidly mounted to a frame (e.g., rigid frame) to form a unified system so that the projectors 16 and the tracking cameras 64 remain in fixed positions relative to one another. Further, the frame may be rigidly mounted to the stage floor 24 or to another stationary surface of the show set. Thus, the frame may block (e.g., reduce or eliminate) drift between projectors 16 and the tracking cameras 64, as well as drift between the projectors 16 and the tracking cameras 64 and the show set, during operation of the attraction 10.

Regardless of how the projectors 16 and the tracking cameras 64 are positioned within the attraction 10, a calibration process is performed to establish a relationship between the projectors 16 and the tracking cameras 64 to enable the projectors 16 to project the images 14 onto the animated FIG. 12 that are tracked via the tracking cameras 64. The calibration process may occur prior to operation of the attraction 10. For example, the calibration process may occur before the week begins, each day before the amusement park opens, before each cycle of the attraction 10, or any combination thereof. In an embodiment, the calibration process may occur (e.g., be triggered) following various events, such as in response to detected offsets between the projected images and the animated figures (e.g., a sensor/imaging device detects the offsets, and this triggers the media system 8 to re-calibrate; an operator visually observes the offsets, and provides an input to instruct the media system 8 to re-calibrate).

FIG. 1 also illustrates an example of an interactive data source 70 that includes guest sensors 72. The guest sensors 72 may collect guest input from any guests 34 within the guest area 32. As recognized herein, the guest input is one form of interactive data that may be utilized to adaptively update the animated FIG. 12 or the attraction 10. The motion control system 50 may generate a response for the animated FIG. 12 to perform based on the interactive data, and then instruct actuators of the animated FIG. 12 to perform the response.

In an embodiment, the animated FIG. 12 is covered with the trackers 60 (e.g., visible or non-visible; active or passive; retro-reflective markers or active emitters). These discrete points on the animated FIG. 12 may be used directly as visual reference points, on which to base a two-dimensional (2D) or a three-dimensional (3D) pose estimation process. These discrete points may also be identified and fed through a machine learning algorithm, compared against known ground truth surface poses, and pose matches made in real time.

Figure 2:
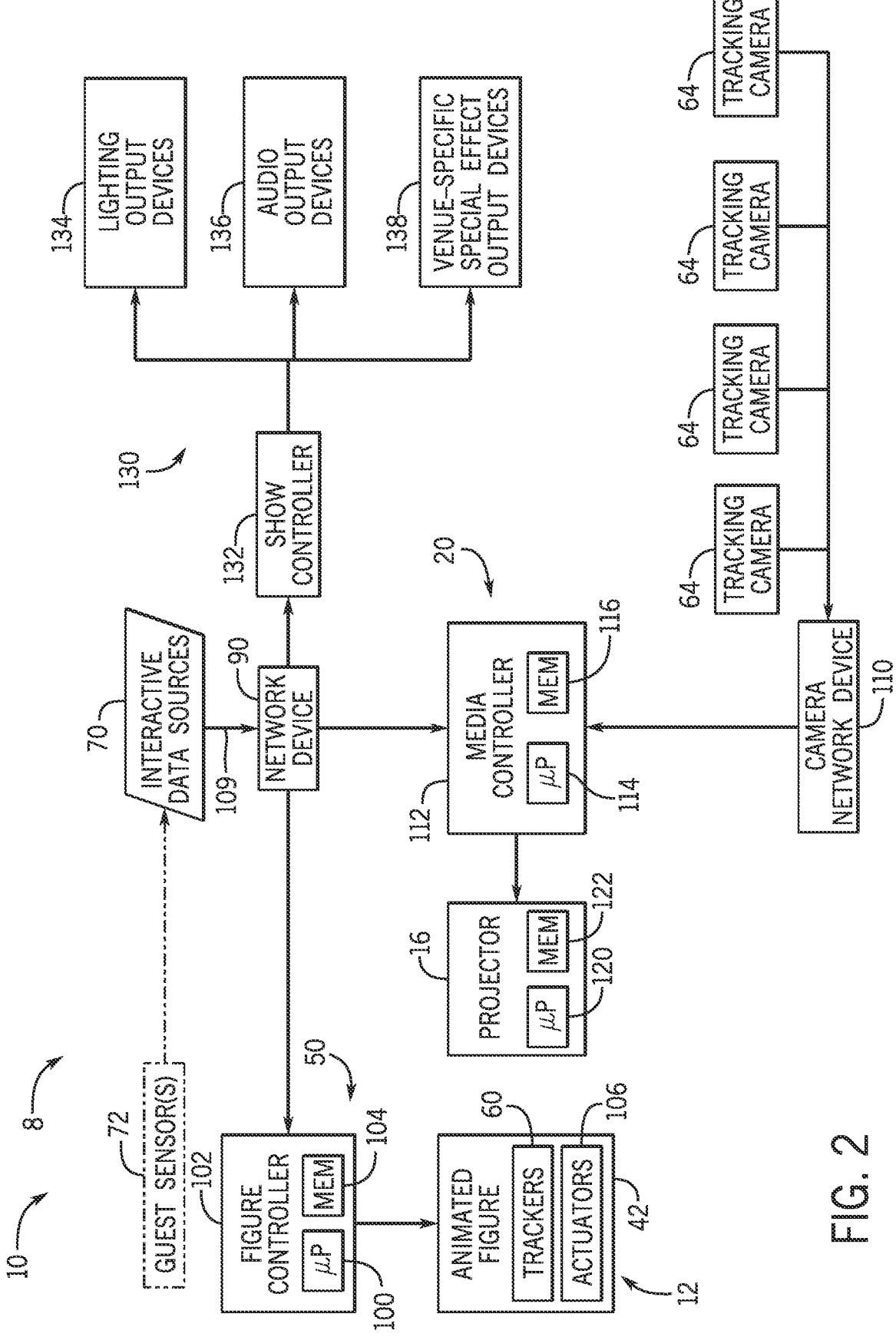
FIG. 2 is a block diagram of an embodiment of the media system of FIG. 1, in accordance with an embodiment of the present disclosure.

FIG. 2 is a block diagram of the media system 8 having the media control system that may operate to externally project images onto the animated FIG. 12 (e.g., without communicatively coupling to or relying exclusively on the motion control system 50). In an embodiment, the media control system 20 may not directly transmit to or receive communication signals from the motion control system 50. However, as discussed below, the interactive data sources 70 may be communicatively coupled upstream of both the media control system 20 and the motion control system 50 to enable coordination of the media control system 20 and the motion control system 50, without intercommunication between the control systems 20, 50. A network device 90, such as a switch or a hub, may be communicatively coupled directly downstream of the interactive data sources 70 to facilitate efficient communications between the interactive data sources 70 and the control systems 20, 50. However, it should be understood that the network device 90 may be omitted, that multiple network devices 90 may be implemented, or that any other suitable data management device may be utilized to facilitate delivery of data from the interactive data sources 70 to the control systems 20, 50.

In the illustrated embodiment, the animated FIG. 12 includes a figure processor 100 and a figure memory 104, which may collectively form all or a portion of a figure controller 102 of the motion control system 50. The trackers 60 are disposed on the body 42 of the animated FIG. 12 to enable the tracking cameras 64 of the motion tracking system of the media control system 20 to sense the position and orientation, or pose, of the animated FIG. 12. The trackers 60 may be active devices, which may each emit an individualized signal to the tracking cameras 64. For example, the trackers 60 may emit infrared light, electromagnetic energy, or any other suitable signal that is detectable by the tracking cameras 64 (and, at least in some cases, undetectable by the guests 34). Alternatively, the trackers 60 may be passive devices (e.g., reflectors, pigmented portions)

that do not emit a signal and that enable the tracking cameras 64 to precisely distinguish the passive devices from other portions of the animated FIG. 12 and/or the attraction 10.

Moreover, the animated FIG. 12 is fitted with any suitable actuators 106 that enable the animated FIG. 12 to move (e.g., ambulate, translate, rotate, pivot, lip synchronize) in a realistic and life-emulating manner. The interactive data sources 70 may include any suitable data source that provides a variable set of data over time as interactive data 109. For example, the guest sensors 72 may sense guest interactions and relay interactive data indicative of the guest interactions to the figure controller 102. Then, the figure controller 102 may instruct the actuators 106 to dynamically manipulate the animated FIG. 12 to immediately respond to the interactive data 109.

The media control system 20 may include the projector 16, the tracking cameras 64, a camera network device 110, and/or a media controller 112. The media controller 112 may be communicatively coupled to the interactive data sources 70 (e.g., via the network device 90), thereby enabling the media controller 112 to dynamically react to the interactive data 109 and/or to other changes in the attraction 10. In an embodiment, the media control system 20 may be communicatively isolated from the motion control system That is, the motion control system 50 may be independent from the media control system 20. Thus, the media control system 20 provides operational freedom to the animated FIG. 12 for adaptively responding to the interactive data 109 in substantially real-time (e.g., within microseconds or milliseconds of an interaction), while the media control system 20 monitors or traces movements of the animated FIG. 12 to project images thereon also in substantially real-time. As such, while the motion control system performs a figure feedback loop, the media control system 20 simultaneously performs a media feedback loop that modifies the images that are projected onto the animated FIG. 12.

To gather information regarding a current position and orientation of the animated FIG. 12, the media control system 20 leverages the tracking cameras 64. A type or configuration of the tracking cameras 64 may be individually selected to correspond to and to detect a type of the trackers 60. The positioning of the trackers 60, in conjunction with geometric or skeletal models of the animated FIG. 12, facilitates coordination of projection onto the animated FIG. 12 in different orientations.

The tracking cameras 64 are communicatively coupled to the camera network device 110, which relays signals indicative of the current three-dimensional position (e.g., including x, y, and z coordinates relative to an origin) and orientation of the animated FIG. 12 or portions thereof (e.g., a pose of the animated FIG. 12) to the media controller 112. The camera network device 110 is therefore a network switch or sensor hub that consolidates multiple streams of information from the tracking cameras 64 for efficient processing by the media controller 112. The media controller 112 includes a media processor 114 and a media memory 116, which operate together to determine, generate, and/or adjust dynamic images to be projected onto the animated FIG. 12 in its current position and orientation. Then, the media controller 112 may instruct the projector 16 to project the dynamic images onto the animated FIG. 12. The images may be wholly rendered on demand based on a current pose (e.g., position and orientation) of the animated FIG. 12. In less complex configurations, the images may be generated by adapting a prerecorded video stream to the current pose of the animated FIG. 12. The media controller 112 may be any suitable media generator or game engine with significant processing power and reduced latency. It should be understood that the media controller 112 is therefore capable of generating the images to be projected onto the animated FIG. 12 in substantially real-time, based on the data received from the tracking cameras 64. Indeed, the media controller 112 may maintain a skeletal model or algorithm that represents the animated FIG. 12 and its actuatable portions (e.g., jaw, limbs, joints). Based on the data, the media controller 112 may update the skeletal model to represent an actual, current position and orientation of the animated FIG. 12, and then generate the images to be projected onto the animated FIG. 12 having the current position and orientation.

The projector 16 may include a projector processor 120 and a projector memory 122 to facilitate the presentation of the images onto the animated FIG. 12. The projector processor 120 generally receives data indicative of the images from the media controller 112, and then instructs a light source within the projector 16 to output the images through a lens. The media controller 112 may determine a current silhouette or a shape of a target figure portion of the animated FIG. 12 that is to receive projected images based on the updated skeletal model, and then instruct the projector 16 to provide the images onto the silhouette.

The processors 100, 114, 120 are each any suitable processor that can execute instructions for carrying out the presently disclosed techniques, such as a general-purpose processor, system-on-chip (SoC) device, an application-specific integrated circuit (ASIC), a processor of a programmable logic controller (PLC), a processor of an industrial PC (IPC), or some other similar processor configuration. These instructions are encoded in programs or code stored in a tangible, non-transitory, computer-readable medium, such as the memories 104, 116, 122 and/or other storage circuitry or device. As such, the figure processor 100 is coupled to the figure memory 104, the media processor 114 is coupled to the media memory 116, and the projector processor 120 is coupled to the projector memory 122. The present embodiment of the media system 8 also includes a show control system 130 that coordinates additional output devices of the attraction 10. For example, a show controller 132 of the show control system 130 is communicatively coupled between the network device 90 and one or multiple lighting output devices 134, audio output devices 136, and/or venue-specific special effect output devices 138 (e.g., fog machines, vibration generators, actuatable portions of the scenery objects 26).

Figure 3:
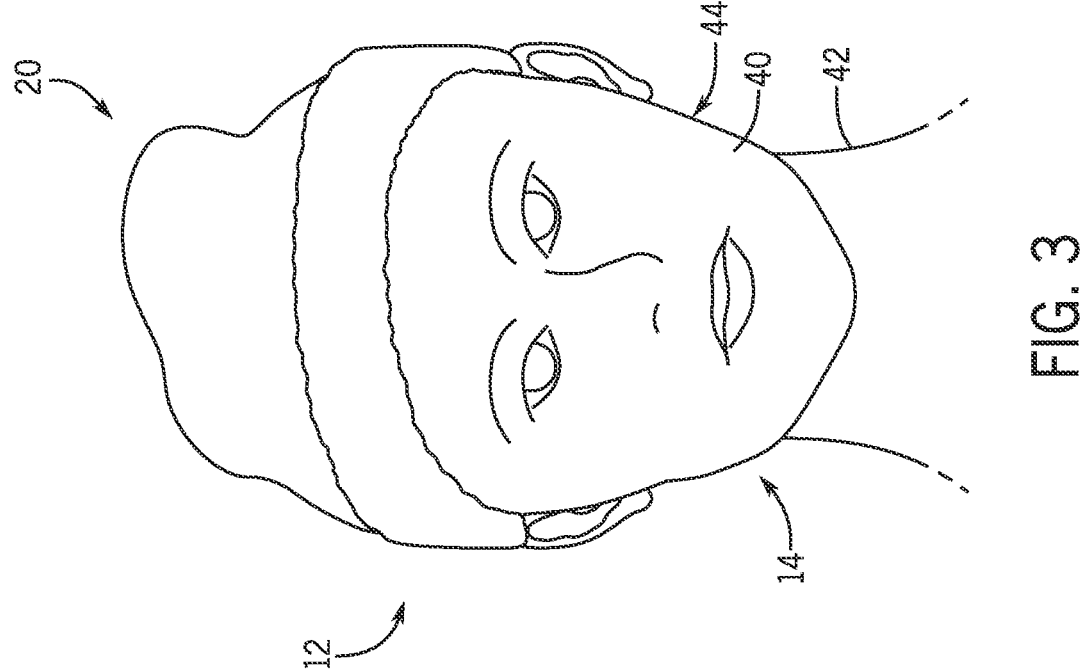
FIG. 3 is a front view of human-like facial features projection mapped onto a head portion of an animated figure using the media system of FIG. 1, in accordance with an embodiment of the present disclosure.

FIG. 3 is a front view of the images 14 provided onto the head portion 44 of the body 42 of the animated FIG. 12. The images 14 may include features or textures that resemble a face. For example, eyebrows, eyes, a nose, lips, and/or wrinkles may be projected on to the head portion 44. The animated FIG. 12 is outfitted with a costume element (e.g., a hat, wig, jewelry), and the media controller 112 and/or the projector 16 may identify an outline of the external surface 40 of the animated FIG. 12 formed by the costume element (e.g., via projection masking). Then, the projector 16 directs the images 14 to a target portion or figure portion of the external surface 40 of the animated FIG. 12. The media control system 20 may monitor movement of the animated FIG. 12, such as large movements across the stage and/or small movements of an articulating jaw, and project appropriate, realistic images onto the head portion 44 of the animated FIG. 12.

Figure 4:
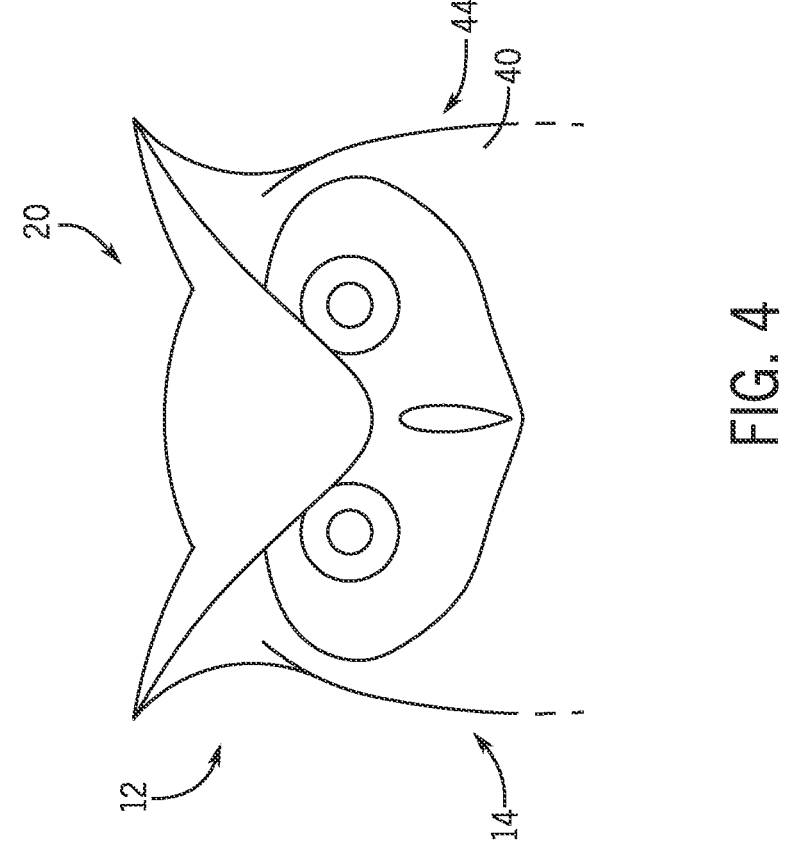
FIG. 4 is a front view of animal-like facial features projection mapped onto a head portion of an animated figure using the media system of FIG. 1, in accordance with an embodiment of the present disclosure.

FIG. 4 is a front view of the images 14 provided onto the external surface 40 of the animated FIG. 12. As illustrated, the images 14 provide the animated FIG. 12 with a character, non-human, or fanciful appearance, such as the appearance of an owl. The external surface 40 of the head portion 44 may be textured to complement the images 14. It should also be understood that the images 14 may also include supernatural, fanciful, or non-human images and/or effects, such as flames, smoke, shapeshifting, color morphing, and so forth.

Figure 5:
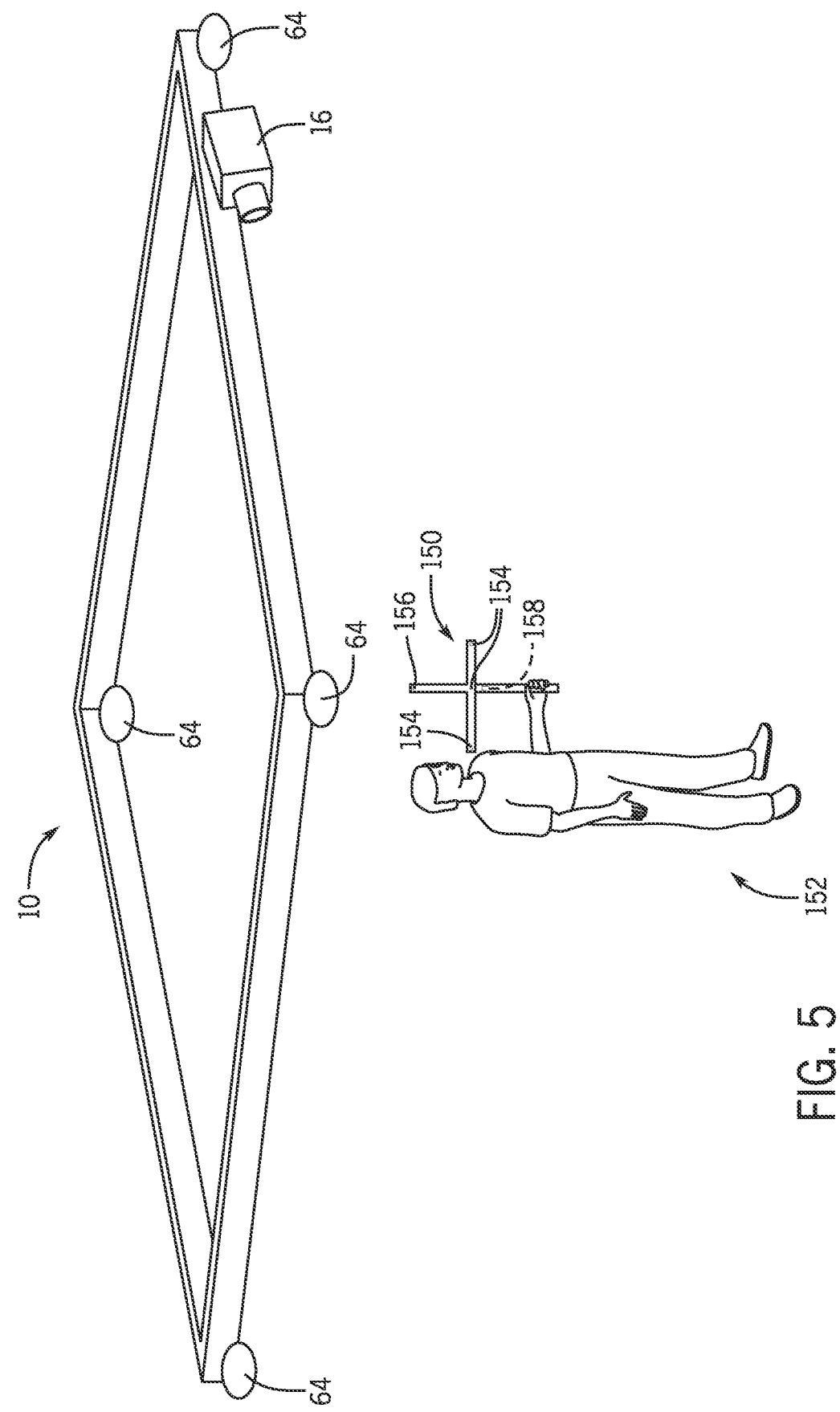
FIG. 5 is a perspective view of a show set of an attraction that may utilize the media system of FIG. 1, wherein a calibration tool is moved through the show set to calibrate tracking cameras of the motion tracking system to one another, in accordance with an embodiment of the present disclosure.

Aspects related to calibration and alignment of the projector 16 and the tracking cameras 64 may be better understood with reference to FIGS. 5-8. In FIG. 5, the attraction 10 is shown including the tracking cameras 64 and the projector 16. A calibration tool 150 (e.g., calibration wand or device) may be used within the show set to carry out the calibration process. As part of an initial portion of the calibration process (e.g., camera calibration; to calibrate the tracking cameras 64 to one another), an operator 152 (e.g., a human operator; an autonomously or remotely controller robot) may carry the calibration tool 150 in the show set. The operator 152 may move the calibration tool 150 around the show set, such as by waving the calibration tool 150 back and forth while also traveling across the show set (e.g., walking or rolling from one side of the show set to another side of the show set). To facilitate the initial portion of the calibration process, the calibration tool 150 includes multiple emitters 154, such as at least three emitters 154. The multiple emitters 154 may be arranged on the calibration tool 150 in a single line or row and at known relative positions. In one embodiment, the multiple emitters 154 may be light emitters (e.g., light emitting diodes [LEDs]). For example, the multiple emitters 154 may be light emitters that emit infrared (IR) light that is detectable by the tracking cameras 64 (and invisible or undetectable by the guests 34).

As the calibration tool 150 moves through the show set, each of the tracking cameras 64 captures multiple image frames (e.g., tens, hundreds, thousands). The media controller 112 or any other suitable processing circuitry of the media system 8 may process multiple image frames to calibrate the tracking cameras 64 to one another. For example, the media controller 112 or the other suitable processing circuitry of the media system 8 may compare the multiple frames to one another to determine the relative locations of the tracking cameras 64 (e.g., compare the multiple frames from the different tracking cameras 64 with the calibration tool 150 at a first location, then compare the multiple frames from the different tracking cameras 64 with the calibration tool 150 at a second location, and so on). Advantageously, the initial portion of the calibration process carried out in this way may also account/compensate for variations in properties of the tracking cameras 64, such as lens distortions of the tracking cameras 64.

As shown, the calibration tool 150 also includes at least one additional emitter 156 (e.g., offset emitter) and at least one sensor 158 (e.g., light detector). The calibration tool 150 may be used to carry out the calibration process periodically (e.g., before the week begins, each day before the amusement park opens, before each cycle of the attraction 10, or any combination thereof) and/or at other suitable times (e.g., in response to certain events). Further, the calibration tool 150 may only be used in the show set during the calibration process and not during performance of a show in the show set. However, in one embodiment, the calibration tool 150 may encompass or include an object of interest (e.g., the prop) onto which the projector 16 will project images during the show. For example, the calibration tool 150 may be a piece of show action equipment (SAE) that is projected onto during the show and/or that only makes an appearance during a portion (e.g., a start; an initial portion) of the show.

Figure 6:
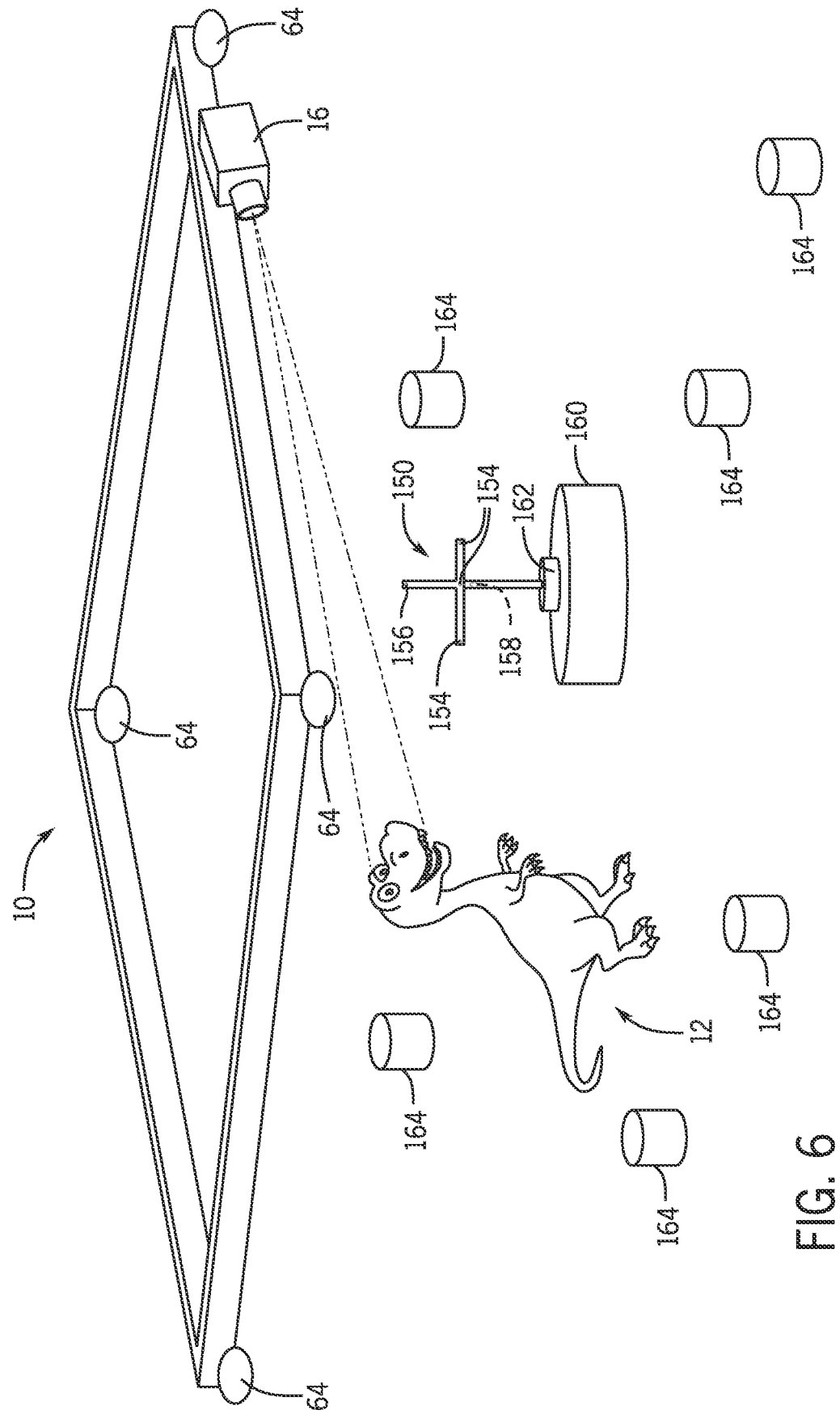
FIG. 6 is a perspective view of the show set of the attraction of FIG. 5, wherein the calibration tool is positioned within the show set to establish an origin point that is used to calibrate the tracking cameras of the motion tracking system and a projector of the projection system to the show set, in accordance with an embodiment of the present disclosure.

FIG. 6 illustrates the attraction 10 including the tracking cameras 64 and the projector 16, wherein the calibration tool 150 is positioned within the show set to establish an origin point (e.g., a common origin point). The origin point may then be used to calibrate the tracking cameras 64 and the projector 16 to the show set, which also effectively calibrates the tracking cameras 64 and the projector 16 to one another.

As part of an additional portion of the calibration process (e.g., origin calibration; to establish the origin point in the show set), the calibration tool 150 may be positioned and held at an origin setting location in the show set. For example, the calibration tool 150 may be fastened (e.g., bolted) and/or otherwise fixed (e.g., via an interference fit) to a structure 160 (e.g., stationary structure) in the show set. In one embodiment, the structure 160 may be mounted (e.g., fastened, such as bolted) onto the stage floor 24 or other surface in the show set, such that the structure 160 remains stationary relative to the show set. In one embodiment, the structure 160 may include a bracket 162 that is configured to support a portion of the calibration tool 150. For example, in FIG. 6, the structure 160 includes the bracket 162 with a recess that is configured to receive the portion of the calibration tool 150. In this way, the calibration tool 150 may be rigidly coupled to the structure 160 and held at the origin setting location within the show set. However, it should be appreciated that the calibration tool 150 may be positioned and held at the origin setting location via any suitable technique.

During the additional portion of the calibration process, at least three emitters on the calibration tool 150 are visible to the tracking cameras 64. In one embodiment, the at least three emitters may include two of the emitters 154 and the additional emitter 156 that are arranged in a triangle (e.g., as the three points, such as three point regions or areas, that form or delineate a triangle shape across the calibration tool 150). Because the tracking cameras 64 were previously calibrated to one another in the initial portion of the calibration process, the at least three emitters arranged in the triangle may be tracked in three-dimensions. The tracking cameras 64 may capture image frames, and the media controller 112 or any other suitable processing circuitry of the media system 8 uses the respective locations of the at least three emitters (e.g., the two emitters 154 and the additional emitter 156) in the image frames to set an origin point within the show set for the tracking cameras 64. For example, the origin point may be set to coincide with a respective center of the additional emitter 156, a respective center of the sensor 158, or any other suitable location. Further, because the at least three emitters have known relative positions and/or spacing on the calibration tool 150, the media controller 112 or any other suitable processing circuitry of the media system 8 uses the respective locations of the at least three emitters (e.g., the two emitters 154 and the additional emitter 156) in the image frames to set a coordinate system based on the origin point within the show set for the tracking cameras 64. In this way, the media controller 112 or any other suitable processing circuitry of the media system may set the origin point (0, 0, 0) and the coordinate system with a x-axis or direction, a y-axis or direction, and a z-axis or direction that is implied as protruding perpendicularly from a 90 degree corner of the triangle.

Then, as part of a sensor mode portion of the calibration process, the calibration tool 150 is moved around the show set while multiple emitters 154, 156 (e.g., all emitters) are instructed to illuminate and while the projector 16 is instructed to emit light (e.g., structured light scan) into the show set toward the calibration tool 150. In one embodiment, the calibration tool 150 is moved around the show set to additional locations to carry out the sensor mode portion of the calibration process (e.g., the steps are carried out sequentially and with the calibration tool 150 at different locations other than the origin setting location). However, it is envisioned that the additional portion of the calibration process and part of the sensor mode portion of the calibration process may be carried out at the same time (e.g., certain steps are carried out simultaneously or at overlapping times at the origin setting location, and then the calibration tool 150 is moved to the additional locations to complete the sensor mode portion of the calibration process). In any case, the calibration tool 150 is placed in multiple locations, such as at least six locations, during the sensor mode portion of the calibration process. To facilitate discussion, FIG. 6 includes multiple additional structures 164 at different locations about the show set (e.g., at least six additional structures 164 placed at least six different locations about the show set). When present, the additional structures 164 may include any of the features of the structure 160 (e.g., fastened to the show set; with respective brackets). In operation, once the additional portion of the calibration portion is completed to set the origin point, the calibration tool 150 may be moved from the structure 160 to each of the additional structures 164 sequentially (e.g., coupled to each of the additional structures 164 sequentially; a first one of the additional structures 164, then a second one of the additional structures 164, and so on). However, it should be appreciated that the disclosed techniques may be carried out without the additional structures 164, and instead, the calibration tool 150 may carried by the operator or positioned in some other manner at the different locations about the show set.

In any case, in each of the multiple locations during the sensor mode portion of the calibration process, the multiple emitters 154, 156 are instructed to illuminate so that the media controller 112 or any other suitable processing circuitry of the media system 8 can track the calibration tool 150 (e.g., a body of the calibration tool 150). Additionally, at the same time and in each of the multiple locations during the sensor mode portion of the calibration process, the projector 16 is instructed to emit light (e.g., structured light scan) into the show set toward the calibration tool 150. The sensor 158 detects the light emitted by the projector 16, and the sensor 158 provides data (e.g., sensor data; signal) to the media controller 112 or any other suitable processing circuitry of the media system 8. The data is processed to determine which pixel(s) of the light from the projector 16 hit the sensor 158 (e.g., an x, y pixel position for that location of the sensor 158). These techniques provide a real world offset position of the sensor 158 (e.g., relative position to the origin point and the coordinate system established for the tracking cameras 64). Thus, this may be used to set the origin point and the coordinate system within the show set for the projector 16 (e.g., determine a pose of the projector 16 relative to the origin point and the coordinate system). In this way, the tracking cameras 64 and the projector 16 are both calibrated to the show set (e.g., based on a common origin point and coordinate system).

The origin point may establish the coordinate system (e.g., two-dimensional or three-dimensional; relative coordinate system for the attraction 10) that does not change during the cycle of the attraction 10. Then, the tracking cameras 64 reference the origin point and the coordinate system to track the animated FIG. 12 within the coordinate system. Additionally, as shown in FIG. 6, the projector 16 may also reference the origin point and the coordinate system to enable the projector 16 to accurately project the images 14 onto the animated FIG. 12 during the cycle of the attraction 10 (e.g., at all times and in all poses). In this way, the tracking cameras 64 and the projector 16 are calibrated and aligned with one another. In operation during the cycle of the attraction 10, when the tracking cameras 64 detect that the animated FIG. 12 (e.g., particular vertices) is at a first set of coordinates, the media controller 112 may then instruct the projector 16 to project the image to the animated FIG. 12 at the first set of coordinates. Because the tracking cameras 64 and the projector 16 have been calibrated and aligned with one another, the image is properly aligned and mapped onto the animated FIG. 12.

It should be appreciated that the media controller 112 may operate generally as a two-dimensional solution (e.g., in an XY coordinate system), such that the animated FIG. 12 is captured with the tracking cameras 64, features or markers of the animated FIG. 12 are identified in two-dimensional space with a shared X/Y origin point of the tracking cameras 64 and the projector 16, and the images are mapped directly to the animated FIG. 12 in the two-dimensional space. In an embodiment, the media controller 112 may operate generally as a three-dimensional solution (e.g., in an XYZ coordinate system). In such cases, machine learning may be used to solve for an estimation of a pose of the animated FIG. 12 in three-dimensional space. Where the animated FIG. 12 has a face, this may generally be a type of facial tracking in which a machine learning model is trained on an extensive set of labeled and tagged facial images, noting pose, expression, proportions, and surface features. The resulting pose estimation can then be used to project masks or digital costume and effects elements in real time.

Figure 7:
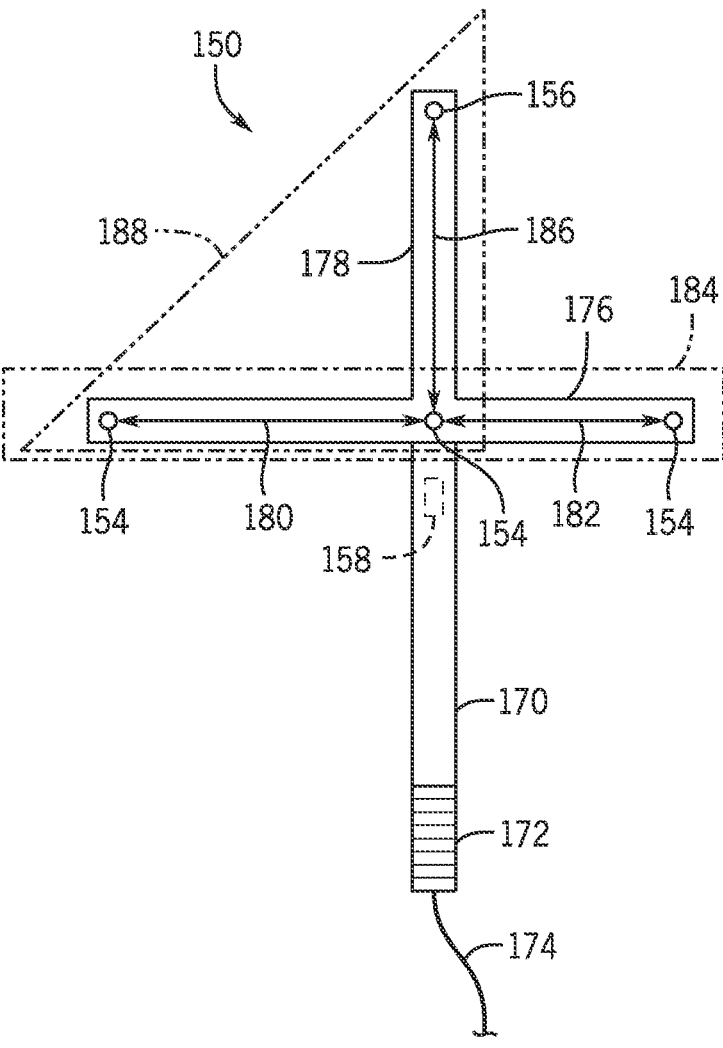
FIG. 7 is a front view of the calibration tool that may be used in the show set of the attraction of FIG. 5, in accordance with an embodiment of the present disclosure.

FIG. 7 is a front view of an embodiment of the calibration tool 150 that may be used as part of the media system 8. As shown, the calibration tool 150 includes a body 170 (e.g., rigid body). The body 170 may include a handle portion 172 that is configured to be gripped by the operator 152. The body 170 may also include or be coupled to a cable 174 that communicates instructions and data between the cable 174 and other devices and/or systems, such as the media controller 112. For example, the cable 174 may communicate instructions from the media controller 112 to illuminate certain emitters 154, 156 (e.g., all of the emitters 154; two of the emitters 154 and the additional emitter 156) and/or may communicate the data from the sensor 158. It should also be appreciated that the cable 174 may provide power to the calibration tool 150. Further, in one embodiment, the calibration tool 150 may include a communication device that is configured to communicate via wireless protocols (e.g., Wi-Fi; Bluetooth) and/or an internal power source (e.g., battery, such as a rechargeable and/or a replaceable battery). In some such cases, the calibration tool 150 may not include or may not be coupled to the cable 174 (or any cable). Further, while the cable 174 is shown to extend from the handle portion 172 to facilitate discussion, it should be appreciated that the cable 174 may extend from any suitable portion of the calibration tool 150 (e.g., other than the handle portion 172 or end portion so that the handle portion 172 or the end portion may more easily be fitted into the bracket 162 or otherwise coupled to the structure 160).

As shown, the body 170 includes a cross-shaped design, with a first arm 176 (e.g., horizontal arm) and a second arm 178 (e.g., vertical arm) that is transverse (e.g., orthogonal) to the first arm. The first arm 176 and the second arm 178 may be separate structures that are fastened (e.g., bolted) to one another, or the first arm 176 and the second arm 178 may be integrally formed (e.g., molded as one-piece). The emitters 154 may be distributed in a single line or row on the calibration tool 150, such as distributed in a single line or row across the first arm 176. The emitters 154 may be at known relative positions (e.g., with known spacing) on the calibration tool 150, and the emitters 154 may not be spaced at equal distances from one another. For example, a first distance 180 between a first emitter 154 and a second emitter 154 may be different than a second distance 182 between the second emitter 154 and a third emitter 154. The different spacing may facilitate the calibration process by enabling detection of an orientation of the calibration tool 150 in the show set based on the different spacing reflected in the multiple image frames captured by the tracking cameras 64. The emitters 154 may form a first group of emitters 184 (e.g., wand emitters; camera alignment emitters).

As shown, the calibration tool 150 also includes the additional emitter 156. The additional emitter 156 may be used together with any two of the emitters 154 to establish the origin point for the tracking cameras 64. The additional emitter 156 and the two emitters 154 may be arranged to form a triangle (e.g., right triangle; not an equilateral triangle; each emitter forms a point of the triangle). The additional emitter 156 and the emitters 154 may be at known relative positions (e.g., with known spacing) on the calibration tool 150, and the additional emitter 156 and the emitters 154 may not be spaced at equal distances from one another. For example, the first distance 180 between the first emitter 154 and the second emitter 154 may be different than a third distance 186 between the additional emitter 156 and the second emitter 154. The different spacing may facilitate the calibration process by enabling detection of the orientation of the calibration tool 150 in the show set based on the different spacing reflected in the multiple image frames captured by the tracking cameras 64. The additional emitter 156 and the two emitters 154 may form a second group of emitters 188 (e.g., camera origin point emitters).

As shown, the calibration tool 150 also includes the sensor 158. The sensor 158 may represent one or more sensors. For example, the sensor 158 may represent or include multiple sensors to detect light that corresponds to multiple pixels of light from the projector 16. As another example, the sensor 158 may represent or include one sensor to detect light that corresponds to one pixel of light from the projector 16 (e.g., smaller sensor area) or multiple pixels of light from the projector 16 (e.g., large sensor area). As yet another example, the sensor 158 may represent or include one sensor to detect aligned/corresponding pixel(s) of light from the projector 16 across multiple structured light scans from the projector 16. In any case, the sensor 158 may be used to establish the origin point for the projector 16.

In FIG. 7, the emitters 154 and the additional emitter 156 are positioned on a front side (e.g., surface) of the calibration tool 150, and the sensor 158 is positioned on a back side (e.g., surface) of the calibration tool 150 that is opposite the front side of the calibration tool 150. This may facilitate completion of the calibration process in the show set that includes the tracking cameras 64 on one side of the show set and the projector 16 on another side (e.g., opposite side) of the show set, as shown in FIG. 1. Generally, it may be desirable to position the tracking cameras 64 behind the animated FIG. 12 so that the trackers 60 are placed on a rear surface of the animated FIG. 12 (e.g., not visible to guests viewing a front surface of the animated FIG. 12), and to position the projector 16 in front of the animated FIG. 12 to project light onto the front surface of the animated FIG. 12 (e.g., visible to the guests). However, the emitters 154, the additional emitter 156, and the sensor 158 may be positioned on one side (e.g., the same side or surface) of the calibration tool 150 to facilitate completion of the calibration process in the show set that includes the tracking cameras 64 and the projector 16 on one side (e.g., the same side) of the show set. Indeed, the emitters 154, the additional emitter 156, and the sensor 158 may be positioned on any sides (e.g., the same side or surface; different sides or surfaces, including opposite sides or surfaces and/or any front/side/back sides or surfaces) of the calibration tool 150 to facilitate completion of the calibration process in the show set that includes the tracking cameras 64 and the projector 16 in various locations of the show set.

The disclosed techniques provide a real world offset position of the sensor 158. When the sensor 158 detects the light emitted by the projector 16, the data output by the sensor 158 indicates a pixel(s) that is aligned with the sensor 158. Thus, the media controller 112 or other suitable processing circuitry of the media system 8 may align the projector 16 to the origin point (e.g., establish a common origin point for the tracking cameras 64 and the projector 16).

It should be appreciated that variations of the calibration tool 150, including variations of the number and/or arrangement of the emitters 154, the additional emitter 156, and the sensor 158, are envisioned. For example, the emitters 154 may be arranged in a single line or row along the second arm 178. As another example, the additional emitter 156 may be used with more additional emitters 156 (e.g., instead of with the emitters 154 that are also used to calibrate the tracking cameras 64 to one another; the emitters 154 may not be reused in the additional portion of the calibration process). More particularly, the calibration tool 150 may include three or more emitters 154 in the first group of emitters 184 to calibrate the tracking cameras 64 to one another and three or more additional emitters 156 in the second group of emitters 188 to establish the origin point for the tracking cameras 64 (e.g., at least six total emitters 154, 156 instead of the at least three total emitters 154, 156 shown in FIG. 7). Further, the sensor 158 may be co-located with one of the emitters 154, 156. For example, the sensor 158 may be positioned on the back side of the calibration tool 150 directly opposite or behind the additional emitter 156 on the front side of the calibration tool 150. Further, as indicated above, the emitters 154, the additional emitter 156, and the sensor 158 may be positioned on one side (e.g., the same side or surface) of the calibration tool 150.

The active, light emitting emitters 154, 156 may facilitate detection by the tracking cameras 64. However, it should be appreciated that one or more of the emitters 154, 156 may be replaced with passive devices that do not emit light or any signal that is detectable by the tracking cameras 64. For example, retroreflective markers may be positioned at the illustrated locations of the emitters 154, 156, and the retroreflective markers reflect light that is detectable by the tracking cameras 64. In such cases, the calibration tool 150 may include movable covers (e.g., movable via electronically controlled actuators and/or manually adjustable) to cover the retroreflective markers that are not desired or used during a current portion of the calibration process. For example, during the initial portion of the calibration process, the retroflective marker positioned at the illustrated location of the additional emitter 156 would be covered, and during the additional portion of the calibration process, at least one of the retroflective markers positioned at the illustrated location of one of the emitters 154 would be covered.

The sensor 158 may be a visible light sensor (e.g., a photodiode) to enable the sensor 158 to detect light from the projector 16 (e.g., the light from the projector 16 may only be within the visible light spectrum). Further, the emitters 154, 156 may be infrared (IR) light emitting diodes (LEDs) to facilitate detection of light from the emitters 154, 156 by the tracking cameras 64 (e.g., the tracking cameras may only capture light with wavelengths associated with IR light). However, the sensor 158 may detect any type of light (e.g., a first type of light), and the emitters 154, 156 may emit any type of light (e.g., a second type of light that is the same or different than the first type of light).

The emitters 154, 156 and the sensor 158 provide different functionality. For example, the purpose of the emitters 154, 156 is to provide a tracking point or "marker" for the tracking cameras 64. Any of a variety of IR LED(s) may be utilized as the emitter 154, 156, and the emitter optical output (beam angle) is equivalent to the IR LED specification. In an embodiment, the emitters 154, 156 may emit light at an approximately 850 nanometer (nm) wavelength. The sensor 158 is used to detect visible light from the projector 16. A diameter of the sensor 158 (e.g., approximately 1 millimeter [mm]) may be sized to correspond with the size of 1 pixel at a target pixel pitch (e.g., 0.05 inches or 1.27 mm per pixel); however, the sensor 158 may be larger or smaller than 1 pixel. In another embodiment, the diameter of the sensor 158 may be approximately 0.5 mm. The sensor 158 may have peak response in the human-visible light spectrum. Ideally, the sensor 158 is a high resolution (16 bit) ambient light sensor and provides a linear response in the range of 0-65 k lux. In an embodiment, the sensor 158 may have a reading value increase as the light moves closer to a center of the sensor 158, which may enable sub-pixel (e.g., pixel of the projector accuracy). In an embodiment, the sensor 158 may be a small array of sensors (e.g., phototransistor array) to achieve a similar result. In an embodiment, the sensor 158 is immune to IR light (inclusive of light leak from the emitters 154, 156). In an embodiment, the sensor 158 is not a photoresistor or phototransistor.

In an embodiment, the emitters 154, 156 are always on (illuminated). Alternatively, the emitters 154, 156 may be controllable, such as via a simple Negative-Positive-Negative (NPN) digital I/O bit. In an embodiment, the sensor 158 is configured to convert the visible light to an analog signal that is either directly outputted as an analog output (e.g., 0-5V, 0-0-15V, 0-20V, 5-10V, 5-15V, 5-20V), or is sensed as a threshold on the sensor amplifier. Once an adjustable threshold has been detected, a NPN digital output is triggered. The sensor bandwidth or scan rate may be at least 50 Hz, ideally at least 100 Hz (or at least 150 Hz, 200 Hz, 250 Hz). Compatible voltages for the system may be 24 Vdc or or any other suitable Vdc. The emitters 154, 156 and the sensor 158 may also be supported on a printed circuit board (PCB) to facilitate coordinated emission of the light by the emitters 154, 156, as well as processing and communication of light detected via the sensor 158, for example. The PCB may also provide a rigid substrate that maintains fixed relative positions of the emitters 154, 156 and the sensor 158.

Figure 8:
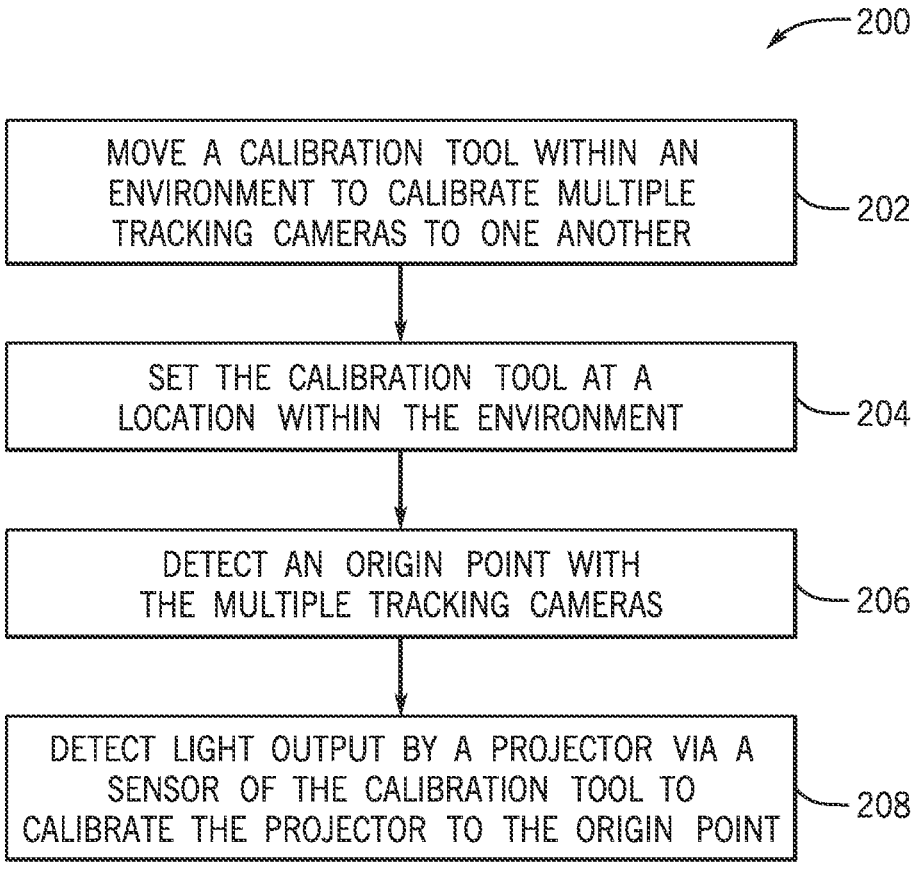
FIG. 8 is a flow diagram of a method of operating the media system of FIG. 1 to complete a calibration process, in accordance with an embodiment of the present disclosure.

FIG. 8 is a flow diagram of an embodiment of a method 200 of operating the media system 8 of FIG. 1. The method 200 includes various steps represented by blocks. It should be noted that the method 200 may be performed as an automated procedure by a system, such as the media system 8 of FIG. 1. Although the flow chart illustrates the steps in a certain sequence, it should be understood that the steps may be performed in any suitable order and certain steps may be carried out simultaneously, where appropriate. Further, certain steps or portions of the method 200 may be performed by separate systems or devices.

In block 202, the method 200 may begin with moving a calibration tool within an environment (e.g., show set of an attraction) to calibrate multiple tracking cameras to one another. As part of this initial portion of the calibration process, an operator (e.g., a human operator; an autonomously or remotely controller robot) may carry the calibration tool within the environment. The operator may move the calibration tool around the environment, such as by waving the calibration tool back and forth while also traveling across the environment. To facilitate the initial portion of the calibration process, the calibration tool includes multiple emitters, such as at least three emitters. The multiple emitters may be arranged on the calibration tool in a single line or row and at known relative positions. In one embodiment, the multiple emitters may be light emitters (e.g., light emitting diodes [LEDs]). For example, the multiple emitters may be light emitters that emit infrared (IR) light that is detectable by the tracking cameras (and invisible or undetectable by guests).

As the calibration tool moves through the environment, each of the tracking cameras captures multiple image frames (e.g., tens, hundreds, thousands). A media controller or any other suitable processing circuitry may process multiple image frames to calibrate the tracking cameras to one another. For example, the media controller or the other suitable processing circuitry may compare the multiple frames to one another to determine the relative locations of the tracking cameras (e.g., compare the multiple frames from the different tracking cameras with the calibration tool at a first location, then compare the multiple frames from the different tracking cameras with the calibration tool at a second location, and so on).

In block 204, the method 200 may continue by setting the calibration tool at a location (e.g., origin setting location) within the environment. As part of this additional portion of the calibration process, the calibration tool may be fastened (e.g., bolted) and/or otherwise fixed (e.g., via an interference fit) to a structure (e.g., stationary structure) in the environment. In one embodiment, the structure may be mounted (e.g., fastened, such as bolted) onto the stage floor or other surface in the environment, such that the structure remains stationary relative to the environment. In one embodiment, the structure may include a bracket that is configured to support a portion of the calibration tool. In this way, the calibration tool may be rigidly coupled to the structure and held at the location within the environment. However, it should be appreciated that the calibration tool may be positioned and held at the origin setting location via any suitable technique.

In block 206, the method 200 may continue by detecting or establishing an origin point with the tracking cameras. During this additional portion of the calibration process, at least three emitters on the calibration tool are visible to the tracking cameras. In one embodiment, the at least three emitters may include two of the emitters used in block 202 and an additional emitter arranged in a triangle (e.g., as the three points that form a triangle across the calibration tool). The tracking cameras may capture image frames, and the media controller or any other suitable processing circuitry uses the respective locations of the at least three emitters in the image frames to set an origin point within the environment for the tracking cameras. For example, the origin point may be set to coincide with a respective center of the additional emitter, a respective center of a sensor, or any other suitable location. Further, because the at least three emitters have known relative positions and/or spacing on the calibration tool, the media controller or any other suitable processing circuitry uses the respective locations of the at least three emitters in the image frames to set a coordinate system based on the origin point within the environment for the tracking cameras.

In block 208, the method 200 may continue with moving the calibration tool 150 to multiple additional locations in the show set (e.g., at least six additional locations in the show set). Further, at each of the multiple additional locations in the show set, the block 208 of the method 200 may include emitting light from the at least emitters (e.g., multiple emitters; all emitters on the calibration tool) and also detecting light (e.g., structured light scan) output by a projector via the sensor of the calibration tool to calibrate the projector (e.g., determine a pose of the projector relative to the origin point and the coordinate system; establish a common origin point and coordinate system for the tracking cameras/motion tracking system and the project/projector system). As part of this sensor mode portion of the calibration process, the projector is instructed to emit light (e.g., structured light scan) into the environment toward the calibration tool. The blocks 202, 204, 206, and 208 may be carried out in a coordinated manner via electronic control signals from the media controller (e.g., automated) and/or via manual inputs from a human operator (e.g., manual).

In any case, the sensor detects the light emitted by the projector, and the sensor provides data (e.g., sensor data; signal) to the media controller or any other suitable processing circuitry. The data is processed to determine which pixel(s) of the light from the projector hit the sensor. The techniques provide a real world offset position of the sensor Thus, this may be used to set the origin point and the coordinate system within the environment for the projector (e.g., determine a pose of the projector relative to the origin point and the coordinate system). In this way, the tracking cameras and the projector are both calibrated to the environment (e.g., based on a common origin point and coordinate system). In particular, an algorithm in the media controller makes the two equal to each other (e.g., associated with each other), such that the coordinates (X, Y, Z) of the origin point in space for the tracking cameras are equal to a pixel location (X1, Y1) relative to the projector's raster.

The origin point and the coordinate system do not change during the cycle of the attraction. Thus, the tracking cameras reference the origin point and the coordinate system to track the animated figure within the coordinate system. Additionally, the projector may also reference the origin point and the coordinate system to enable the projector to accurately project the images onto the animated figure during the cycle of the attraction (e.g., at all times and in all poses). In this way, during the cycle of the attraction, when the tracking cameras detect that the animated figure (e.g., particular vertices) is at a first set of coordinates, the media controller may then instruct the projector to project the image to the animated figure at the first set of coordinates. Because the tracking cameras and the projector have been calibrated and aligned with one another, the image is properly aligned and mapped onto the animated figure.

Advantageously, the calibration tool disclosed herein includes emitters that operate as both a calibration wand for tracking cameras (e.g., via a single line of emitters) and a calibration triangle for the tracking cameras (e.g., via three emitters the form points of a triangle), as well as a projector calibration for a projector (e.g., via a sensor). It should be appreciated that any features shown or described with reference to FIGS. 1-8 may be combined in any suitable manner. While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A calibration tool for a dynamic projection mapping system, the calibration tool comprising:
   a rigid body comprising a first side and a second side that is opposite the first side;
   a row of at least three light emitters disposed on the first side of the rigid body;
   an additional light emitter disposed on the first side of the rigid body and offset from the row of the at least three light emitters; and
   a sensor disposed on the second side of the rigid body and configured to detect projected light.

2. The calibration tool of claim 1, wherein two light emitters in the row of the at least three light emitters and the additional light emitter are configured to form a triangle of emitters.

3. The calibration tool of claim 1, wherein the at least three light emitters and the additional emitter are configured to emit infrared light.

4. The calibration tool of claim 1, wherein the sensor is configured to detect visible projected light.

5. The calibration tool of claim 1, wherein the rigid body comprises a handle portion configured to be gripped by an operator.

6. The calibration tool of claim 1, wherein the rigid body comprises a first arm and a second arm that is transverse to the first arm.

7. A dynamic projection mapping system, comprising:
   a projector configured to project visible light;
   a calibration tool, comprising:
      a plurality of emitters configured to emit infrared light; and
      a sensor configured to detect the visible light projected by the projector;
   a plurality of tracking cameras configured to generate image data that indicates the infrared light emitted by the plurality of emitters; and
   processing circuitry configured to establish a common origin point for the projector and the plurality of tracking cameras based on sensor data received from the sensor and the image data received from the plurality of tracking cameras.

8. The dynamic projection mapping system of claim 7, wherein the calibration tool comprises a rigid body with a first side and a second side that is opposite the first side, the plurality of emitters is positioned on the first side, and the sensor is positioned on the second side.

9. The dynamic projection mapping system of claim 7, wherein the plurality of emitters comprises a row of at least three emitters and an additional emitter that is offset from the row of the at least three emitters.

10. The dynamic projection mapping system of claim 9, wherein two emitters in the row of the at least three emitters and the additional emitter are arranged to form a triangle of emitters.

11. The dynamic projection mapping system of claim 10, wherein the processing circuitry is configured to instruct the row of the at least three emitters to emit the infrared light and to calibrate the plurality of tracking cameras to one another based on additional image data generated by the plurality of tracking cameras while the row of the at least three emitters emits the infrared light, and subsequently, the processing circuitry is configured to instruct the triangle of emitters to emit the infrared light and to establish the common origin point for the plurality of tracking cameras based on the image data generated by the plurality of tracking cameras while the triangle of emitters emits the infrared light.

12. The dynamic projection mapping system of claim 7, wherein the calibration tool comprises a handle portion that is configured to be gripped by an operator.

13. The dynamic projection mapping system of claim 7, wherein the plurality of tracking cameras is configured to track a prop based on detection of one or more trackers coupled to the prop, and the projector is configured to project images onto the prop as the prop moves through an environment.

14. The dynamic projection mapping system of claim 7, comprising:

a prop configured to move through an environment; and one or more trackers on the prop, wherein the plurality of tracking cameras is configured to generate additional image data that represents the one or more trackers in the environment based on detection of the one or more trackers on the prop by the plurality of tracking cameras;

wherein the processing circuitry is configured to determine a position of the prop relative to the common origin point based on the additional image data and instruct the projector to project the visible light onto the prop based on the position of the prop relative to the common origin point.

15. A method of operating a projection system and an optical tracking system for dynamic projection mapping, the method comprising:

instructing, via processing circuitry, a set of emitters of a calibration tool to emit light in an environment;

receiving, from a plurality of tracking cameras and at the processing circuitry, image data indicative of respective locations of each emitter of the set of emitters in the environment;

instructing, via the processing circuitry, a projector to project visible light into the environment;

receiving, from a sensor of the calibration tool and at the processing circuitry, sensor data indicative of the visible light detected by the sensor; and establishing, via the processing circuitry, a common origin point in the environment for the plurality of tracking cameras and the projector based on the image data and the sensor data.

16. The method of claim 15, comprising:

instructing, via the processing circuitry, a row of at least three emitters of the calibration tool to emit respective light in the environment; and receiving, from the plurality of tracking cameras and at the processing circuitry, initial image data indicative of respective locations of each emitter of the row of emitters in the environment; and calibrating, via the processing circuitry, the plurality of tracking cameras to one another based on the initial image data.

17. The method of claim 16, comprising calibrating the plurality of tracking cameras to one another based on the initial image data prior to instructing the set of emitters of the calibration tool to emit light in the environment.

18. The method of claim 15, comprising:

tracking, via the plurality of tracking cameras and the processing circuitry, a prop in the environment relative to the common origin point based on detection of one or more trackers coupled to the prop; and instructing, via the processing circuitry, the projector to project images onto the prop as the prop moves through the environment based on a position of the prop relative to the common origin point.

19. The method of claim 15, wherein the set of emitters comprises three emitters arranged to form points of a triangle.

20. The method of claim 15, wherein the calibration tool comprises a rigid body with a first side and a second side that is opposite the first side, the set of emitters is positioned on the first side, and the sensor is positioned on the second side.

* * * * *